US012651274B2

(12) United States Patent
Walters et al.

(10) Patent No.: US 12,651,274 B2

(45) Date of Patent: ***Jun. 9, 2026

(54) SYSTEMS AND METHODS FOR ASSISTING USERS IN ASSESSING COSTS OF TRANSACTIONS

(71) Applicant: Capital One Services, LLC, McLean, VA (US)

(72) Inventors: Austin Walters, Savoy, IL (US); Jeremy Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 99 days.

This patent is subject to a terminal disclaimer.

(21) Appl. No.: 18/466,407

(22) Filed: Sep. 13, 2023

(65) Prior Publication Data

US 2023/0419351 A1 Dec. 28, 2023

Related U.S. Application Data

(63) Continuation of application No. 17/215,006, filed on Mar. 29, 2021, now Pat. No. 11,790,384, which is a continuation of application No. 16/682,091, filed on Nov. 13, 2019, now Pat. No. 10,990,992.

(51) Int. Cl.
| | |
|---|---|
| *G06Q 30/0201* | (2023.01) |
| *G06Q 30/0204* | (2023.01) |
| *G06Q 30/0601* | (2023.01) |

(52) U.S. Cl.
CPC ..... *G06Q 30/0206* (2013.01); *G06Q 30/0201* (2013.01); *G06Q 30/0205* (2013.01); *G06Q 30/0633* (2013.01); *G06Q 30/0641* (2013.01)

(58) Field of Classification Search
CPC .......... G06Q 30/0206; G06Q 30/0201; G06Q 30/0633; G06Q 30/0641; G06Q 30/0205
See application file for complete search history.

(56) References Cited

U.S. PATENT DOCUMENTS

| | | | |
|---|---|---|---|
| 8,958,652 B1 | 2/2015 | Steves et al. | |
| 2008/0091546 A1* | 4/2008 | Kirovski | G06Q 30/0629 |
| | | | 705/26.64 |
| 2011/0040601 A1 | 2/2011 | Bai et al. | |
| 2011/0131079 A1 | 6/2011 | Valentine et al. | |
| 2012/0030061 A1 | 2/2012 | Lu et al. | |
| 2014/0114872 A1 | 4/2014 | Morgan et al. | |
| 2015/0227875 A1 | 8/2015 | Chillar et al. | |

(Continued)

*Primary Examiner* — Deirdre D Hatcher

(74) *Attorney, Agent, or Firm* — Bookoff McAndrews, PLLC

(57) ABSTRACT

Systems and methods are disclosed for assisting users in assessing costs of transactions. For instance, method may include: determining a cost value of at least one transaction associated with a user; classifying the user into a category, based on consumer interest characteristics of the user and consumer interest characteristics associated with the category; determining a relatable product based on the consumer interest characteristics associated with the category, the relatable product being a product purchased by a plurality of persons classified in the category; determining a relatable cost value, the relatable cost value being a representation of the cost value of the at least one transaction using a quantity of the respective relatable product; and presenting the relatable cost value to the user.

19 Claims, 6 Drawing Sheets

(56) References Cited

U.S. PATENT DOCUMENTS

| | | | |
|---|---|---|---|
| 2016/0162913 A1 | 6/2016 | Linden et al. | |
| 2016/0180465 A1* | 6/2016 | Deperro | G06Q 40/06 705/36 R |
| 2017/0098197 A1 | 4/2017 | Yu et al. | |
| 2017/0337586 A1 | 11/2017 | Izumo et al. | |

* cited by examiner

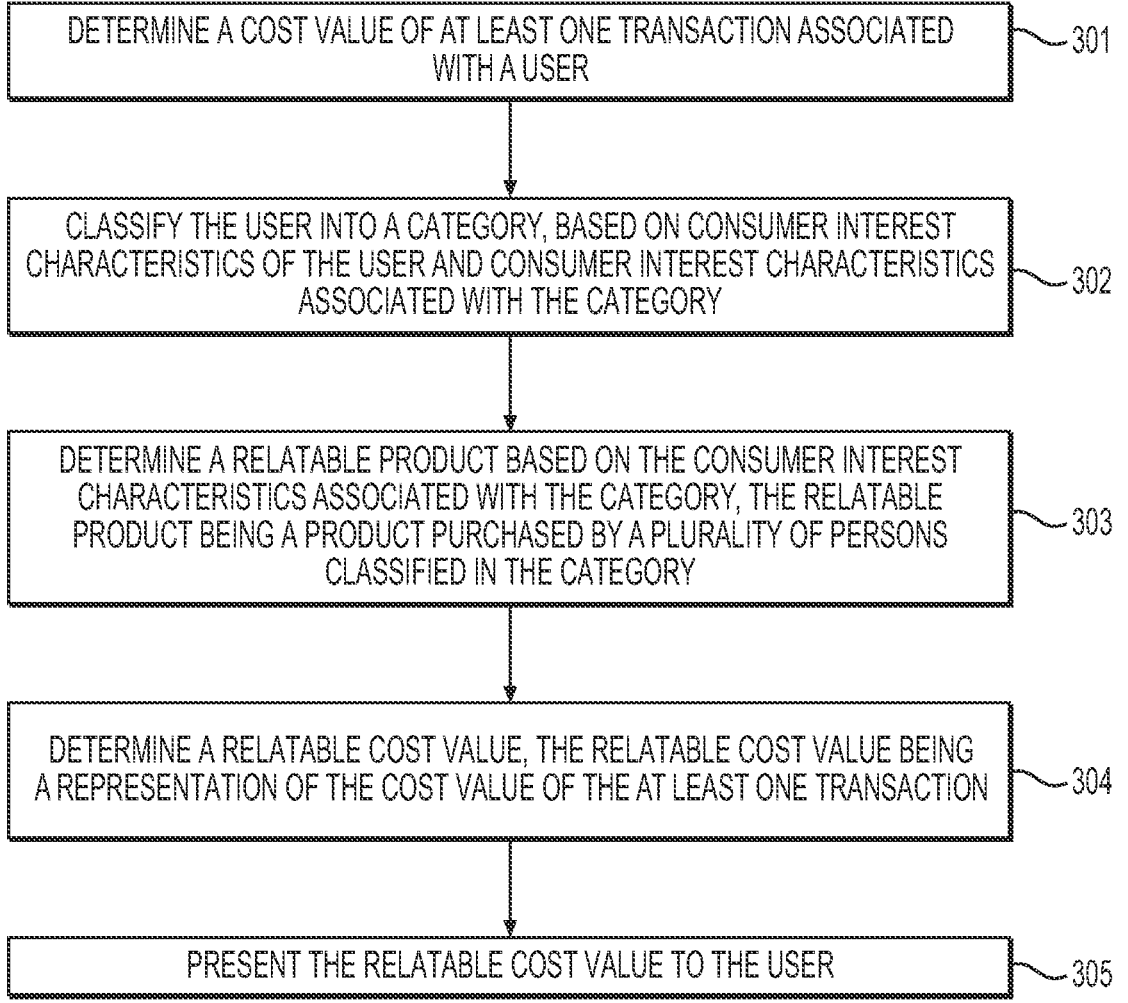

DETERMINE A COST VALUE OF AT LEAST ONE TRANSACTION ASSOCIATED WITH A USER — 301

CLASSIFY THE USER INTO A CATEGORY, BASED ON CONSUMER INTEREST CHARACTERISTICS OF THE USER AND CONSUMER INTEREST CHARACTERISTICS ASSOCIATED WITH THE CATEGORY — 302

DETERMINE A RELATABLE PRODUCT BASED ON THE CONSUMER INTEREST CHARACTERISTICS ASSOCIATED WITH THE CATEGORY, THE RELATABLE PRODUCT BEING A PRODUCT PURCHASED BY A PLURALITY OF PERSONS CLASSIFIED IN THE CATEGORY — 303

DETERMINE A RELATABLE COST VALUE, THE RELATABLE COST VALUE BEING A REPRESENTATION OF THE COST VALUE OF THE AT LEAST ONE TRANSACTION — 304

PRESENT THE RELATABLE COST VALUE TO THE USER — 305

*FIG. 3*

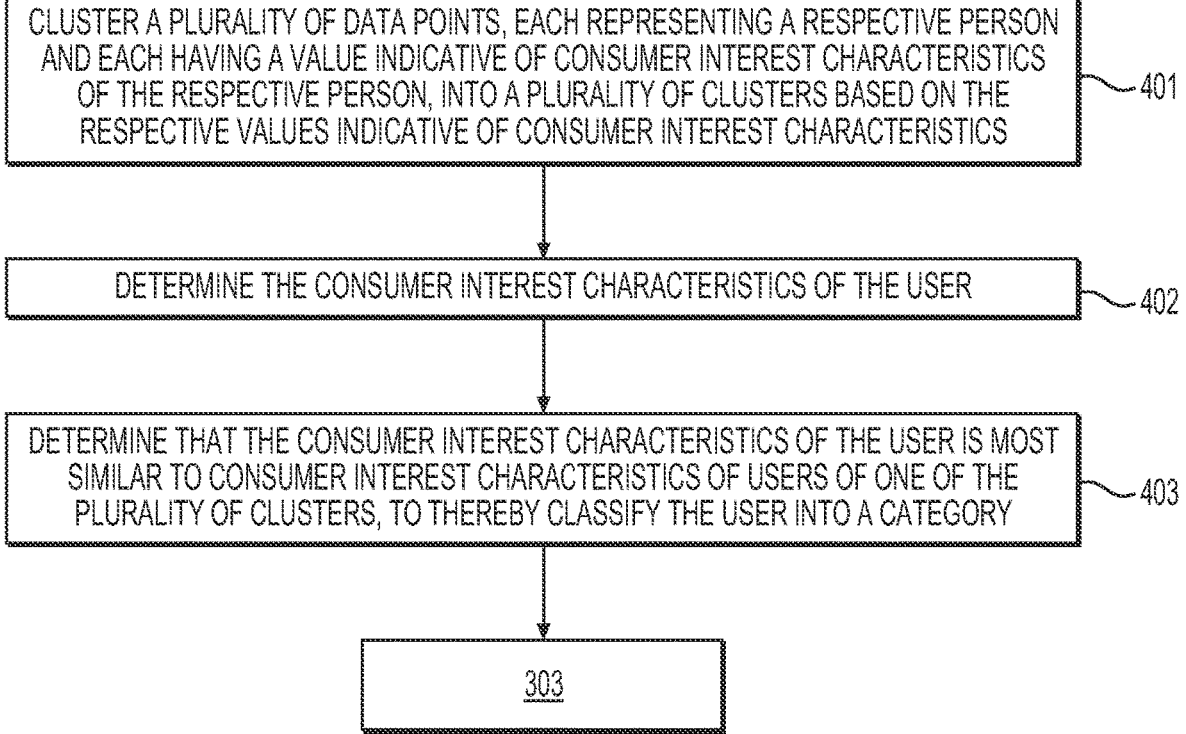

CLUSTER A PLURALITY OF DATA POINTS, EACH REPRESENTING A RESPECTIVE PERSON AND EACH HAVING A VALUE INDICATIVE OF CONSUMER INTEREST CHARACTERISTICS OF THE RESPECTIVE PERSON, INTO A PLURALITY OF CLUSTERS BASED ON THE RESPECTIVE VALUES INDICATIVE OF CONSUMER INTEREST CHARACTERISTICS ⁓401

DETERMINE THE CONSUMER INTEREST CHARACTERISTICS OF THE USER ⁓402

DETERMINE THAT THE CONSUMER INTEREST CHARACTERISTICS OF THE USER IS MOST SIMILAR TO CONSUMER INTEREST CHARACTERISTICS OF USERS OF ONE OF THE PLURALITY OF CLUSTERS, TO THEREBY CLASSIFY THE USER INTO A CATEGORY ⁓403

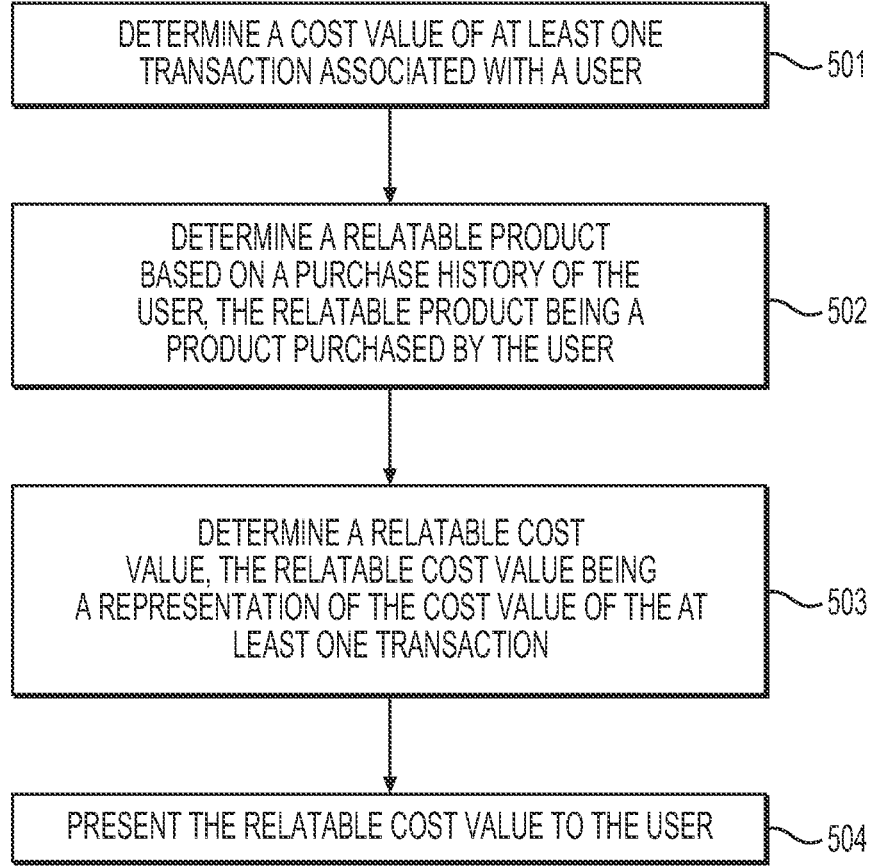

DETERMINE A COST VALUE OF AT LEAST ONE
TRANSACTION ASSOCIATED WITH A USER — 501

DETERMINE A RELATABLE PRODUCT
BASED ON A PURCHASE HISTORY OF THE
USER, THE RELATABLE PRODUCT BEING A
PRODUCT PURCHASED BY THE USER — 502

DETERMINE A RELATABLE COST
VALUE, THE RELATABLE COST VALUE BEING
A REPRESENTATION OF THE COST VALUE OF THE AT
LEAST ONE TRANSACTION — 503

PRESENT THE RELATABLE COST VALUE TO THE USER — 504

*FIG. 5*

SYSTEMS AND METHODS FOR ASSISTING USERS IN ASSESSING COSTS OF TRANSACTIONS

CROSS-REFERENCE TO RELATED APPLICATION(S)

This patent application is a continuation of and claims the benefit of priority to U.S. Nonprovisional patent application Ser. No. 17/215,006, filed on Mar. 29, 2021, which is a continuation of U.S. Nonprovisional patent application Ser. No. 16/682,091, filed on Nov. 13, 2019, now U.S. Pat. No. 10,990,992, each of which are incorporated herein by reference in their entireties.

TECHNICAL FIELD

Various embodiments of the present disclosure relate generally to assisting users in assessing the costs of transactions.

BACKGROUND

A person may have trouble relating to or understanding a monetary amount or monetary rate. Therefore, when it comes to acquiring goods or utilizing services that are priced at a certain monetary amount or at a certain hourly rate, a person may have difficulty in intuitively understanding the extent of the cost involved. Accordingly, there is a need for systems and methods to assist persons in assessing the cost of a transaction.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for assisting users in assessing costs of transactions.

For instance, a computer-implemented method may include: determining a cost value of at least one transaction associated with a user; classifying the user into a category, based on consumer interest characteristics of the user and consumer interest characteristics associated with the category; determining a relatable product based on the consumer interest characteristics associated with the category, the relatable product being a product purchased by a plurality of persons classified in the category; determining a relatable cost value, the relatable cost value being a representation of the cost value of the at least one transaction using a quantity of the respective relatable product; and presenting the relatable cost value to the user.

Furthermore, a computer-implemented method may include: determining a cost value of at least one transaction associated with a user; determining a relatable product based on a purchase history of the user, the relatable product being a product purchased by the user; determining a relatable cost value, the relatable cost value being a representation of the cost value of the at least one transaction as a quantity of the respective relatable product; and presenting the relatable cost value to the user.

Furthermore, a computer system may include: a memory storing instructions; and one or more processors configured to execute the instructions to perform operations. The operations may include: clustering a plurality of data points, each representing a respective person and each being indicative of consumer interest characteristics of the respective person, into a plurality of clusters using unsupervised or semi-supervised clustering; determining that a user is interested in completing at least one transaction to purchase the service; determining a cost value of the at least one transaction; matching a user data point, being indicative of consumer interest characteristics of the user, to a first cluster of the plurality of clusters; determining a relatable product based on consumer interest characteristics indicated by data points of the first cluster, the relatable product being a product purchased by a plurality of persons represented by the data points of the first cluster; determining a relatable cost value, the relatable cost value being a representation of the cost value of the at least one transaction and being a number of the respective relatable product; and presenting the relatable cost value to the user.

According to additional aspects of the disclosure, a non-transitory computer-readable medium stores instructions that, when executed by one or more processors, cause the one or more processors to perform the aforementioned computer-implemented method or the operations that the aforementioned computer system is configured to perform.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 is a flowchart illustrating a method for assisting users in assessing costs of transactions, according to one or more embodiments.

FIG. 4 is a flowchart illustrating a method of categorizing a user that may be used for the method illustrated by FIG. 3.

FIG. 5 is a flowchart illustrating another method for assisting users in assessing costs of transactions, according to one or more embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value. In the context of numerical values, the term "approximately" may be used to cover variations in a numerical value resulting from rounding, including variations that are greater than 10%.

In the following description, embodiments will be described with reference to the accompanying drawings. As will be discussed in more detail below, a monetary value, such as a monetary amount or a monetary rate, may be made more readily understandable to a person by the use of a relatable value. The relatable value may represent the monetary amount or monetary rate using a quantity of a relatable product, whose cost is readily familiar to the person. In some examples, the monetary value may be a cost value, in which case the relatable value may be referred to as a relatable cost value. For example, in an example discussed below in more detail, a cost value that is a rate of $2.03 per hour may be represented as a daily cost of 7 items of a product familiar to the person. In order to generate a relatable cost value based on a relatable product, the relatable product may be determined based on consumer interest characteristics of the person to whom the relatable cost value is to be presented. Accordingly, with the benefit of the relatable cost value, the cost value of the transaction may be more easily assessed. In the following description, a person may also be referred to as a user of a computer system.

Figure 1:
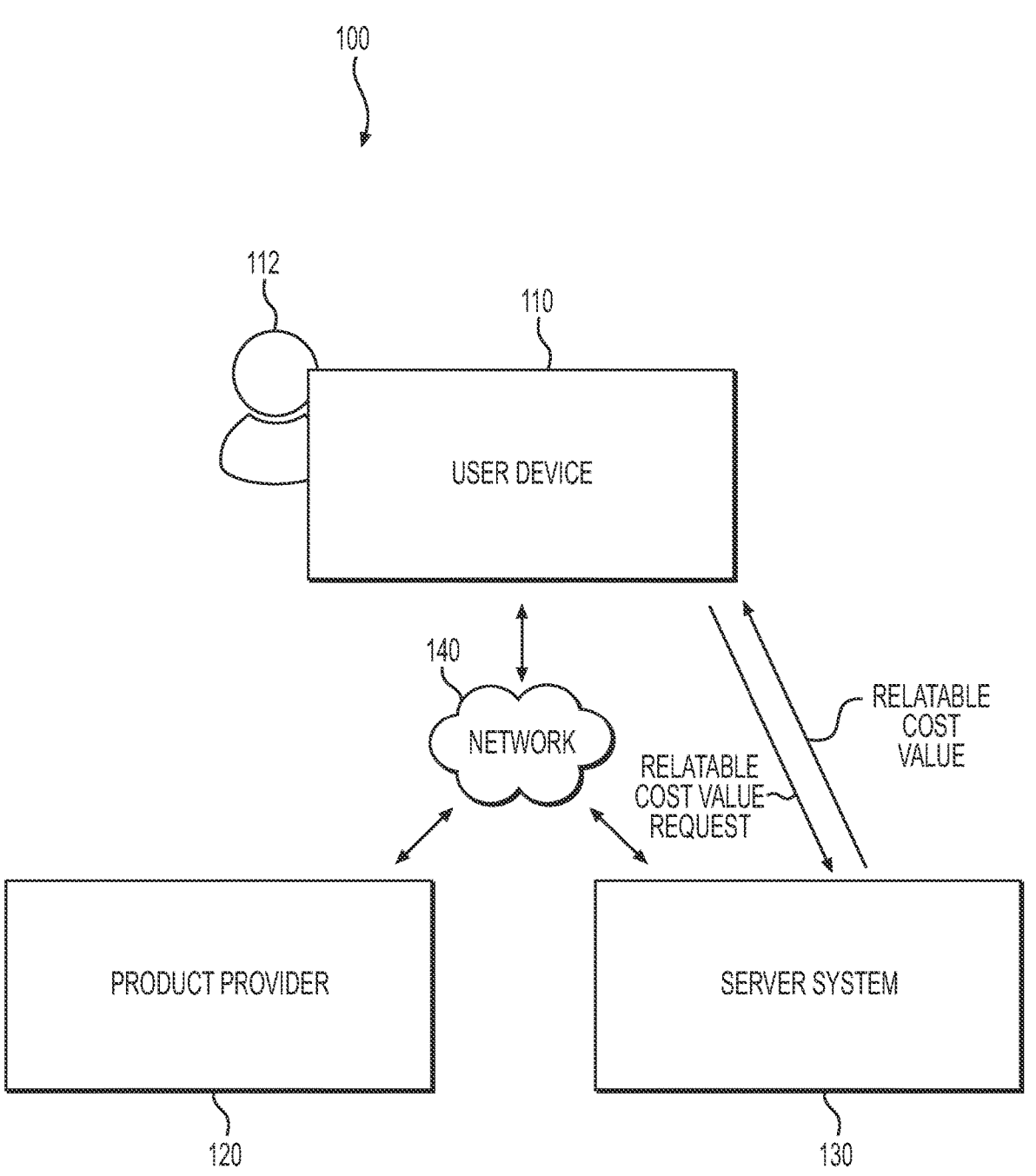
FIG. 1 depicts an exemplary system environment, according to one or more embodiments.

FIG. 1 illustrates a system environment 100 according to one or more embodiments. The system environment 100 may include a user device 110 operated by a user 112, a product provider 120, and a server system 130. User device 110, product provider 120, and server system 130 may communicate with each other through a communications network 140, which may include a public network, such as the Internet, a private network, or a combination of networks of any suitable type.

Server system 130 may be a computer system that determines a relatable value corresponding to a certain monetary value. A monetary value may be, for example, a cost value of at least one transaction associated with a user, such as user 112. In this disclosure, the term "monetary value" may encompass a monetary amount or a rate (e.g., a monetary amount per unit of time). Thus, if the monetary value is a cost value of a transaction (or of a plurality of transactions, if the at least one transaction is a plurality of transactions), then the cost value may be a monetary amount or a rate (e.g., a monetary amount per unit of time), and the corresponding relatable value may be referred to as a relatable cost value. As will be discussed in more detail below, a relatable value (e.g., a relatable cost value) may be a representation of the monetary value (e.g., cost value) in a manner that is more readily relatable to user 112.

In this disclosure, the term "transaction associated with a user" may refer to a prospective transaction that has not yet occurred, or a completed transaction that has already occurred. In the case of a prospective transaction, the transaction may have a cost value that is expected to be incurred by the user (e.g., user 112) or by some other party as a result of the transaction. In the case of a completed transaction, the transaction may have a cost value that has already been incurred by the user (e.g., user 112) or by some other party as a result of the transaction. An example of a transaction is a prospective or completed acquisition or utilization of a product at a certain cost. Referring to FIG. 1, the product that is being acquired or utilized may be provided by product provider 120. At the time the relatable cost value is determined by server system 130, the cost associated with the acquisition (e.g., purchase) or utilization of the product may be expected to be charged or has already been charged to user 112 or some other party. In this disclosure, an expected cost value may encompass an estimated, prospective cost value.

While the aforementioned monetary value is exemplified as a cost value in various examples of this disclosure, the present disclosure is not so limited. For example, the monetary value may instead be an amount of income or a rate of income (e.g., an hourly, weekly, or monthly rate). In some embodiments, the monetary value may be an income value of at least one transaction associated with a user (e.g., user 112). For example, the income value may be an hourly rate that is received by user 112 as income for providing a service, or may be a one-time amount of income associated with a sale transaction.

Furthermore, any techniques described in this disclosure for cost or income may also be applied to other concepts such as revenue and profits. It is noted that the aforementioned monetary value may, in general, be any monetary amount or monetary rate regardless of context.

User 112 may be a person who operates user device 110. However, where context permits, user 112 may also represent an entity (e.g., a company or other organization) that includes or utilizes such a person operating user device 110. User device 110 may be a computer system that receives the relatable cost value from server system 130 for the benefit of user 112. User device 110 may be any suitable computer system, such as a laptop or desktop computer, or a mobile computing device such as a smartphone, tablet, or wearable computing device. User device 110 may include an electronic display, such as a computer monitor or a touchscreen.

In some embodiments, user device 110 may be operated by user 112 to perform an action resulting in the acquisition or utilization of a product provided by product provider 120. For example, product provider 120 may operate a website offering a product for sale or utilization, and user 112 may operate a web browser on user device 110 to purchase the product from the website. In such embodiments, the server system 130 may, for example, provide user device 110 with the relatable cost value prior to the actual purchase of the product. In such embodiments, the relatable cost may therefore be associated with a prospective transaction that has not yet occurred.

In other embodiments, user device 110 may be operated by user 112 to view a completed transaction. For example, user device 110 may execute an application, such as a mobile banking application or a budgeting application, permitting user 112 to view completed financial transactions (e.g., credit card purchases) of a financial account (e.g., credit card account) of the user 112. In such embodiments, server system 130 may provide user device 110 with a relatable cost value for the completed financial transactions, or group of financial transactions, upon receiving a request from user device 110 to compute the relatable cost value. For example, the application may have a feature that permits the user 112 to request a relatable cost value for a particular financial transaction, or group of financial transactions. In such embodiments, server system 130 may also service the application.

Product provider 120 may represent an entity (e.g., a company, business, merchant, or organization) that provides a product that is purchasable by user 112. In situations where product provider 120 communicates electronically with user device 110 or server system 130, product provider 120 may include a computer system, operated by such an entity or on behalf of such an entity, that performs such communication. Such a computer system may, for example, host a website or service permitting a product to be purchased or utilized.

In this disclosure, the term "product" encompasses both goods and services. A product may be any type of product, including, but not limited to, consumer goods (e.g., goods purchasable from an e-commerce website), industrial goods, consumer services (e.g., media and entertainment services), and industrial services (e.g., business services, information technology and computing-related services, and database access). Such products may be offered for sale, or for use at a certain cost, by product provider 120. For example, product provider 120 may be a merchant that operates an e-commerce website enabling user 112 to make purchases of goods. As another example, product provider 120 may be a service provider that provides a network-accessible service. For example, product provider 120 may be a cloud service provider that provides cloud computing resources for user 112.

User device 110 may transmit, to server system 130, a request for a relatable cost value corresponding to a cost value of a certain transaction. This request may be referred to as a relatable cost value request. For example, user device 110 may have a web browser extension or other software functionality that generates the request for the relatable cost value. The generation of the request may be automatic or manual. In order to provide user device 110 with the requested relatable cost value, server system 130 may determine the cost value of the transaction and compute the relatable cost value based on the cost value.

In some embodiments, the cost value may be included with the relatable cost value request received from user device 110. However, it is also possible for the server system 130 to receive the cost value from product provider 120 or otherwise determine the cost value using information provided by user device 110 and/or product provider 120.

Upon determining the relatable cost value, server system 130 may present the relatable cost value to user 112. For example, server system 130 may transmit a message to user device 110 that describes or is otherwise indicative of the relatable cost value, such that the relatable cost value is displayed on the electronic display of user device 110.

It is noted that while server system 130 is illustrated in FIG. 1 as being separate from product provider 120, it is also possible for server system 130 to be part of product provider 120. In general, the functionalities performed by server system 130 may be performed by any computer system, including user device 110. Server system 130 may generically be referred to as a computer system that performs the attributed functionalities described in this disclosure.

Figure 2:
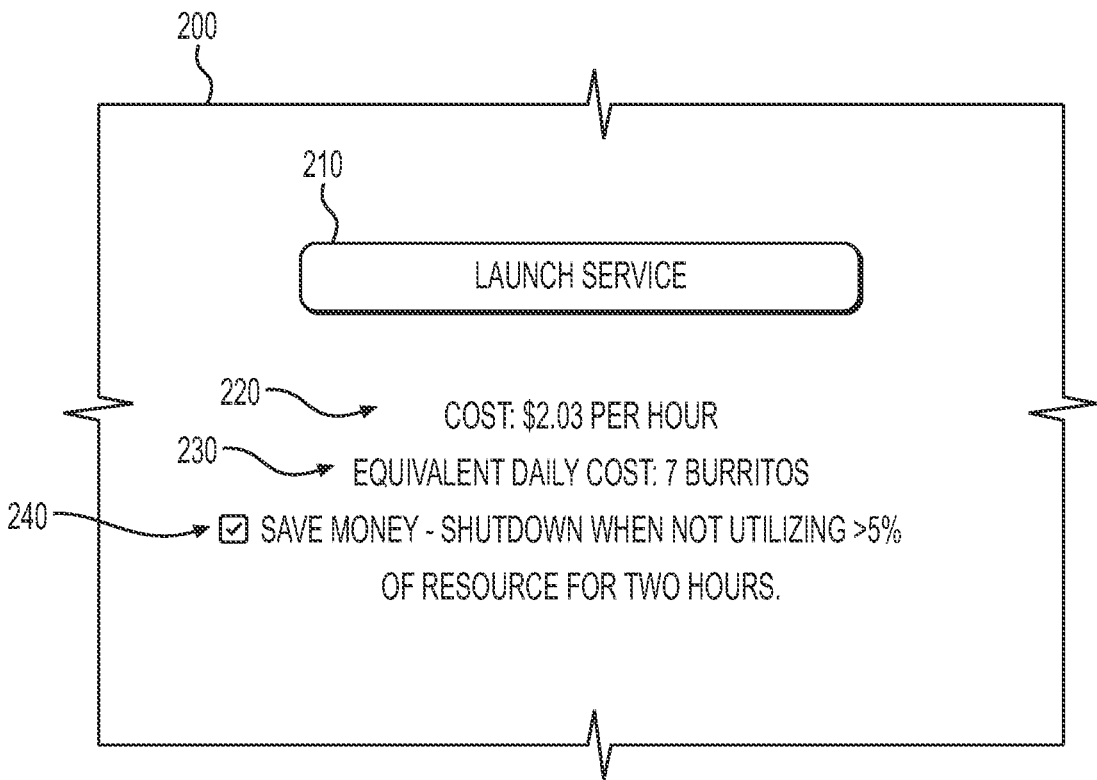
FIG. 2 depicts an exemplary user interface that displays a relatable cost value together with a base cost value, according to one or more embodiments.

FIG. 2 illustrates a user interface 200 for presenting a relatable cost value to user 112. User interface 200 may be an interface displayed on the electronic display of user device 110. As shown in FIG. 2, user interface 200 may include an interactive element 210 (e.g., a clickable button) permitting user 112 to launch a service having a cost value of $2.03 per hour.

As described above, the cost value of a transaction (e.g., the utilization of a service at a certain cost) may be a monetary amount or a rate of a monetary amount. A monetary amount may be an amount expressed in a unit of currency (e.g., $100 or €100). A rate of a monetary amount may be a monetary amount per unit of time. For example, in the context of a product that is charged based on time, such as a time of utilization of a product, the cost value may be a monetary amount per hour (e.g., a rate of $10 per hour or €10 per hour), a monetary amount cost per minute, or a monetary amount per day. In the case of a plurality of transactions, the cost value of the plurality of transactions may be the total cost for every transaction of the plurality of transaction.

In the following description, the cost value of the transaction may also be referred to as the base cost value, since it serves as the basis for computing a relatable cost value. As described above, a relatable cost value may be a representation of the base cost value in a manner that is relatable to a person (e.g., user 112). The relatable cost value may permit user 112 to understand the extent of the base cost value in a more understandable manner. The relatable cost value may represent the cost value of the transaction using (e.g., in terms of) a quantity of a relatable product. A relatable product may be a product whose cost is familiar to user 112. The quantity of the relatable product may be such that the per-unit cost of the relatable product multiplied by the quantity is equivalent or approximately equivalent to the cost value of the transaction.

If the base cost value is a rate expressed as a monetary amount per unit of time, then the quantity of the relatable product may be a quantity for a unit of time, such as a daily quantity, a weekly quantity, or a yearly quantity. In general, the term "quantity" may broadly encompass a quantity per unit of time, when permitted by context. The relatable cost value does not necessarily have to be computed or presented in the same unit of time as that of the base cost value. For example, if the base cost value is a monetary amount per minute, the relatable cost value may represent the base cost value as a quantity per day, which is also referred to as a daily quantity. It is noted that the above described concept of being equivalent or approximately equivalent extends to equivalence after accounting for a change in the unit of time.

The relatable cost value may be expressed in any suitable form. In some embodiments, the quantity of the relatable cost may be a rounded or truncated to a nearest integer, or to a certain decimal accuracy. The term "approximately equivalent" may encompass the concept of a non-exact equivalence as a result of rounding or truncation of the relatable cost value.

FIG. 2 provides an illustration of a relatable cost value. In FIG. 2, user interface 200 may include a cost value display 220 displaying the cost value and a relatable cost value display 230 displaying the relatable cost value. In this example, the cost value of the service is a rate of charge of $2.03 per hour, which may be an estimated cost value.

The service referenced in FIG. 2 may be a cloud computing service. An example of a cloud computing service is a graphics processing unit (GPU) instance. Product provider 120 may provide GPU instances at the aforementioned hourly rate. User 112 may be part of an organization that utilizes GPU instances for machine learning tasks. User device 110 may be, for example, a personal computer used by user 112 to launch a GPU instance and utilize the GPU instance to perform machine learning tasks. In this context, user 112 may be, for example, a software developer, researcher, or engineer, and the cost of the service may be paid for by an organization to which user 112 works for, such as a company that employs user 112. Therefore, the organization may benefit from avoiding excessive or unnecessary costs associated with user 112's use of the cloud computing service. By providing user 112 with a relatable cost value, user 112 may obtain a better understanding of the cost of the cloud computing service, so that the organization may avoid excessive or unnecessary costs resulting from user 112's use of the service. In FIG. 2, the user interface 200 may include interactive elements 240 used to enable cost saving functionalities. User 112 may be more likely to use such functionalities if user 112 is more able to understand the cost of the service.

In the example shown in FIG. 2, the relatable cost value is 7 burritos per day, which may be expressed as a daily cost of 7 burritos. The relatable cost value may be determined by selecting a burrito as a relatable product, determining the price of a burrito, and computing the relatable cost value as an equivalent cost value expressed in a suitable unit (e.g., a per-day cost). For example, if the cost of a burrito is $6.75, then a charge $2.03 per hour over 24 hours would be $48.72, which is equal to 7.22 burritos. If the relatable cost value is to be expressed as a daily quantity expressed as a non-zero integer, then the relatable cost value would be a daily quantity of 7 burritos.

FIG. 2 may also represent an online checkout. For example, interactive element 210 may be a button of an electronic commerce website or application that is used to place an online order.

FIG. 3 illustrates a method for determining and presenting a relatable cost value. In general, the method of FIG. 3 may utilize any of the techniques described above in connection with FIGS. 1-2, wherever applicable. Additional techniques and embodiments are also described below. The method may be performed by any suitable computer system, such as server system 130.

Step 301 may include determining a cost value of at least one transaction associated with a user 112. The cost value may be determined using any of the techniques described above. As described above, in some embodiments, the at least one transaction may be, or include, a prospective purchase of a product or service. In such embodiments, step 301 may include determining that user 112 is interested in completing the transaction. This determination may include determining that user 112 is viewing, on a user device 110, a graphical user interface used to complete the transaction. The graphical user interface may be, for example, a payment or shopping cart interface of a website displayed in a web browser executed on the user device 110. If step 301 is performed by a server system 130 that is remote from user device 110, the server system 130 may receive information from the web browser extension indicating that the user is viewing the interface of the website. This information may be part of a related cost value request sent by the web browser extension.

In some embodiments, the at least one transaction may be, or include, a payment transaction completed by the user. For example, as described above, the completed payment transaction may be viewed on an application executed on user device 110, such as a mobile banking application. In such embodiments, the user device 110 may generate a request to generate the relatable cost, and the relatable cost value may be provided by server system 130 in response to the request.

Step 302 may include classifying the user into a category, based on consumer interest characteristics of the user and consumer interest characteristics associated with the category. Step 302 may be performed using a cluster analysis method as illustrated in FIG. 4.

In the method of FIG. 4, step 401 may include clustering a plurality of data objects, each representing a respective person and each having a value indicative of consumer interest characteristics of the respective person, into a plurality of clusters. The clustering may be based on the respective values indicative of consumer interest characteristics. Step 401 may be performed independently of the method illustrated in FIG. 3. For example, if server system 130 provides relatable cost values as an online service, the plurality of clusters may be determined and stored in server system 130 prior to performing the method illustrated in FIG. 3.

Each of the plurality of data objects may have values for one or more attributes used to characterize persons. Such attributes may pertain to determining consumer interest characteristics of a person, such as frequency purchased products, behavior in purchasing products, products of interest, and demographic information (e.g., age, gender, geographic location, profession, and interests). Data objects may be interchangeably referred to as data samples or data points and may each include a feature vector comprising a plurality of features. In this disclosure, a "feature" may include a combination of an attribute and a value of the attribute.

The grouping of the plurality data objects into clusters may utilize a clustering algorithm, such as a hierarchical clustering algorithm, a centroid-based clustering algorithm (e.g., k-means), a density-based clustering algorithm (e.g., DBSCAN and mean-shift), a distribution-based clustering algorithm (e.g., expectation-maximization), a k-nearest neighbors algorithm, and/or any other suitable algorithm, or combinations thereof. That is, the grouping of the data objects into clusters may be unsupervised. However, it is also possible for the grouping of data objects into clusters to be supervised or semi-supervised. The plurality of clusters produced in step 401 may, in some embodiments, each be "hard" clusters in that each data object in the first training set is included in no more than one of the plurality of clusters. However, it is also possible for data objects to have membership in more than one cluster.

Step 402 may include determining the consumer interest characteristics of the user 112. The consumer interest characteristics of the user 112 may be determined based on any suitable information indicative of the consumer interest characteristics of the user 112, such as a purchase history of the user 112 and/or demographic information of the user 112 (e.g., age, gender, geographic location, profession, and interests). The purchase history of user 112 may indicate products frequently purchased by the user 112, and/or the user 112's behavior in purchasing products. Information indicative of consumer interest characteristics may be voluntarily provided by the user 112 to server system 130, determined by server system 130 (e.g., based on an internet protocol address of the user device 110), and/or accessed by the computer system performing step 402 from another source. In embodiments in which server system 130 is part of a financial services institution, server system 130 may have access to past purchases of the user 112.

Step 403 may include determining that the consumer interest characteristics of the user is most similar to consumer interest characteristics of users of one of the plurality of clusters. Each cluster may correspond to a category of users. That is, if a data object representing a previously unclassified user is determined to be closer to one particular cluster than to any other cluster of the plurality of clusters, that user may be considered to be categorized in the category represented by that particular cluster.

By determining that user 112 is most similar to a particular cluster, step 403 may result in a categorization of user 112, in accordance with step 302. For example, a certain cluster may correspond to persons typically of age 25-35 within a certain geographical location, and the user 112 may be determined to be more similar to the characteristics of this cluster than of other clusters. Accordingly, user 112 may be classified within this particularly cluster, so as to be classified into a category corresponding to the cluster.

In step 403, "similarity" may be determined on the basis of a similarity score representing a closeness between values of the attributes used for assessment of similarity in the data objects of the second training set and values of the same attributes in data objects of a respective cluster. For example, the score may be a distance between the respective means of the two sets of values. This similarity score may be calculated for each of the plurality of clusters, and the cluster with the score reflecting a highest degree of similarity may be determined as the cluster that is most similar to the second training set. If two clusters are equally similar (e.g., having the same similarity score), a tiebreak method may be implemented to select one of the two clusters.

Referring again to FIG. 3, step 303 may include determining a relatable product based on the consumer interest characteristics associated with the category. The relatable product may be a product that has been purchased by a plurality of persons classified in the category. The relatable product may be selected from a group of candidate products based on satisfaction of one or more criteria. The one or more criteria may be, for example, a product that has been purchased by a threshold percentage of persons represented by data objects in the matched cluster, a product having a threshold consistency in price across a plurality of geographical locations, or a combination of the foregoing.

Step 304 may include determining a relatable cost value corresponding to the relatable product determined in step 303. As described above, the relatable cost value may be a representation of the cost value of the transaction as a quantity of the relatable product.

In some embodiments, a plurality of relatable products may be initially selected, and a relatable cost value is presented for only one of the plurality of relatable products. In such embodiments, step 303 may include determining the plurality of relatable products based on the consumer interests characteristics associated with the category, each of the plurality of relatable products having different prices. The plurality of relatable products may be selected such that they are products having different respective prices. For example, each relatable product of the plurality of relatable products may have a price that differs from the price of every other relatable product by at least an order of magnitude. Then, in step 304, a plurality of relatable cost values are respectively determined for the plurality of relatable products, and one out of the plurality of relatable cost values is selected to be presented to the user 112 based on one or more selection criteria used to determine priority among different relatable cost values. However, the present disclosure is not so limited, and it is possible for multiple relatable cost values, respectively corresponding to all or more than one of the plurality of relatable products, to be presented to the user 112.

In some embodiments, when a plurality of relatable cost values are respectively determined for a plurality of relatable products, each of the plurality of relatable cost values may be rounded to a nearest whole number, and the relatable cost value that is the smallest non-zero whole number after the rounding may be selected to be presented to the user 112. For example, returning to the example illustrated in FIG. 2 with the exemplary cost value of $2.03 per hour (which is a daily cost of $48.72), if a plurality of relatable products further includes a first additional product having a cost of $0.50 per unit and a second additional product having a cost of $100.00 per unit, in addition to the aforementioned burrito, then the relatable cost value based on the cost of first additional product may be 97 ($48.72/$0.50 per unit=97.44 units, which is rounded to 97 units), and the relatable cost value based on the cost of second additional product may be 0 ($48.72/$100 per unit=0.4872 units, which is rounded to 0). Accordingly, based on the selection criteria of selecting the smallest non-zero whole number, the relatable cost value based on the cost of the burrito may be selected over the other relatable cost values.

Step 305 may include presenting the relatable cost value to the user 112. In this context, if step 305 is performed by a server system 130 that is remote from user device 110, then the act of "presenting" may be satisfied by transmitting the relatable cost value to the user device 110, wherein the user device 110 is configured to then present the relatable cost value to user 112.

FIG. 5 illustrates another method for assisting users in assessing costs of transactions, according to one or more embodiments. In general, the method may utilize any of the techniques described above in connection with FIGS. 1-2, wherever applicable. Additional techniques and embodiments are also described below. The method may be performed by any suitable computer system, such as server system 130.

Step 501 may include determining a cost value of at least one transaction associated with a user (e.g., user 112). Step 501 may be performed using the techniques described in connection with step 301 of FIG. 3.

Step 502 may include determining a relatable product based on a purchase history of the user 112, the relatable product being a product purchased by the user 112. For example, instead of, or in addition to, classifying user 112 into a category as described for step 302 of FIG. 3, the computer system may examine a purchase history of user 112, and determine a product that is frequently purchased by that user 112 (e.g., purchased a threshold number of times over a recent period of predetermined length) as the relatable product.

In some embodiments, server system 130 may have access to a financial account of the user 112, and may be able to determine the user 112's purchase history using the financial account. Such a server system 130 may be part of a financial services institution, and may service the mobile banking application, as described above.

In some embodiments, the method of FIG. 5 may be performed by user device 110, which may have access to the user 112's purchase history.

Step 503 may include determining a relatable cost value, the relatable cost value being a representation of the cost value of the at least one transaction as a quantity of the respective relatable product. Step 503 may be performed using any of the techniques described above in relation to step 304 of FIG. 3.

Step 504 may include presenting the relatable cost value to the user 112. Step 504 may be performed using any of the techniques described above in relation to step 305 of FIG. 3.

While examples have been described in which the transaction associated with user 112 is a purchase, the present disclosure is not so limited. As described above, the transaction associated with user 112 does not necessarily have to be a transaction associated with a cost to user 112, but may instead be a transaction associated with an income or revenue to user 112. For example, the transaction may be, for example, the sale of a product or the providing of a service.

Furthermore, the "cost value of at least one transaction associated with a user" as described above may be substituted by any monetary amount or monetary rate (e.g., monetary amount per unit of time), without limitation as to the context of the monetary amount or monetary rate and without limitation as to whether the monetary amount or monetary rate is associated with user 112. Therefore, in some embodiments the element of "cost value of at least one transaction associated with a user" described for the methods illustrated by FIGS. 3-5 and the methods described in connection with FIGS. 1-2 may generally be a monetary value, as described above, without limitation to whether or not the monetary value is a cost value.

In additional embodiments, the techniques of the present disclosure may be implemented in the contexts described in U.S. application Ser. No. 14/974,322 (the "'322 application"), the disclosure of which is hereby incorporated by reference in its entirety. The '322 application describes, for example, a server for providing real-time monitoring of spending limits. The methods described in this disclosure, such as the methods depicted in FIGS. 3-5, may be implemented in the server for providing real-time monitoring of spending limits described in the '322 application. In general, server system 130 of FIG. 1 may have any of the functionalities of the server for providing real-time monitoring of spending limits described in the '322 application.

For example, server system 130 may be configured to: determine that a user has interacted with a store item within a retail environment; generate an analysis of an estimated impact of the purchase (e.g., an estimated impact of the purchase impact on a savings goal of the user); and provide the analysis to a device (e.g., user device 110) for display to the user (e.g., user 112), in the manner described in the '322 application for a server for providing real-time monitoring of spending limits. The determination of the user interaction with the store item may be a determination that the user is interested in completing a purchase of the store item. To determine the cost value of the prospective purchase (in accordance with step 301 and step 501, for example), server system 130 may determine the cost of the store item in the manners described in the '322 application. In generating the analysis of the estimated impact of the purchase, server system 130 may generate a relatable cost value corresponding to the cost value of the store item within the retail environment. This relatable cost value may be determined using any of the methods described in this disclosure, and may be presented as part of, or together with, the analysis of the estimated impact.

As described above, server system 130 of FIG. 1 may have any of the functionalities of the server for providing real-time monitoring of spending limits described in the '322 application. For example, server system 130 may be further configured to access a user profile of the user, wherein the user profile includes at least one savings goal of the user, as described in the '322 application. The user profile may be indicative of the consumer interest characteristics of the user (e.g., as described above in connection with steps 302 and 402), and/or the purchase history of the user (e.g., as described above in connection with step 402). Server system 130 may be further configured to determine that a purchase of the store item would meet at least one trigger condition from among a plurality of trigger conditions associated with the at least one savings goal, as described in the '322 application. This determination that the purchase of the store item would meet at least one trigger condition may trigger the generation of the relatable cost value and may, for example, take place prior to step 302 of the method depicted in FIG. 3 or prior to step 502 of the method depicted in FIG. 5. As described above, the techniques of the present disclosure enables a user to more readily assess (e.g., understand and appreciate) the extent of the cost of a transaction, by presenting the user with a relatable cost value. Many benefits may be derived from a greater understanding and appreciation of the extent of a cost of a transaction. For example, companies, organizations and other entities may benefit from a reduction of unnecessary or excessive expenditure resulting from employee actions. Accordingly, the techniques of the present disclosure may help promote efficient usage of financial resources. Additionally, users who are looking to make a purchase may be more informed about the cost of the purchase. Furthermore, users may benefit from receiving relatable cost values to help them assess costs that have already been incurred. Therefore, the techniques of the present disclosure may help users in budgeting.

In general, any method discussed in this disclosure that is understood to be computer-implementable, such as the methods described in connection with FIGS. 3-5, may be performed by one or more processors of a computer system, such as server system 130 or a computer system that implements the functionalities described for server system 130, as described above. A method or method step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or another type of processing unit.

A computer system, such as client device 110, product provider 120, and/or server system 130, may include one or more computing devices. If the one or more processors of the computer system is implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

Figure 6:
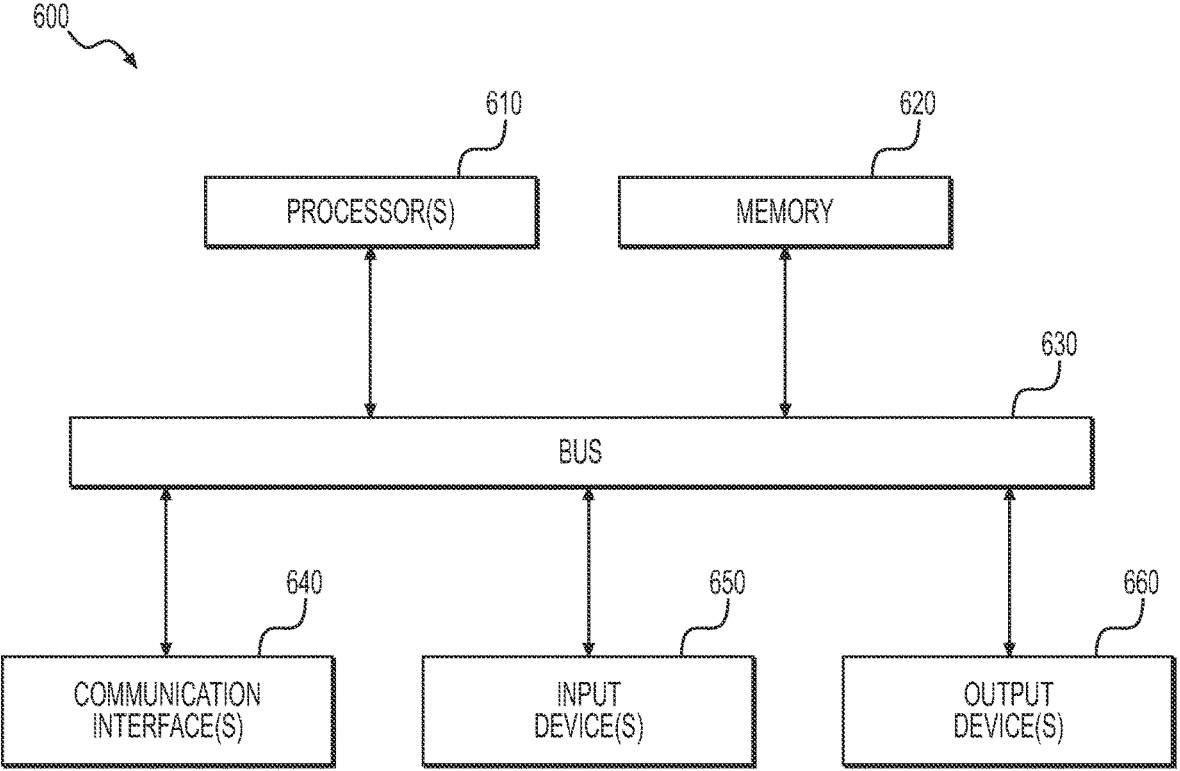
FIG. 6 depicts an exemplary computing device, according to one or more embodiments.

FIG. 6 illustrates an example of a computing device 600 of a computer system. The computing device 600 may include processor(s) 610 (e.g., CPU, GPU, or other processing unit), a memory 620, and communication interface(s) 640 (e.g., a network interface) to communicate with other devices. Memory 620 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 620. The computing device 600 may, in some embodiments, further include input device(s) 650 (e.g., a keyboard, mouse, or touchscreen) and output device(s) 660 (e.g., a display, printer). The aforementioned elements of the computing device 600 may be connected to one another through a bus 630, which represents one or more busses.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, configure and/or cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method of performing real-time monitoring, comprising:
   determining, via a browser extension operating on a user device associated with a user and based on an interaction between the user and a graphical user interface of a browser also operating on the user device, that the user is considering whether to perform an activity that results in an income for the user, wherein:
   the interaction is prior to a performance of the activity by the user; and
   the determination is received by a server system that includes a processor and a memory that stores user financial data, relatable product data related to a plurality of products, and cost values of the plurality of products, wherein the user financial data includes at least one financial goal of the user, and the at least one financial goal is associated with at least one trigger condition;
   in response to receiving the determination, determining, via the processor and based on the user financial data, that the income resulting from performing the activity meets the at least one trigger condition associated with the financial goal of the user;
   in response to determining that the at least one trigger condition has been met, determining, via the processor, and based on the relatable product data, a relatable value for the income, the relatable value being a representation of the value of the income as a quantity of a relatable product from amongst the plurality of products; and
   causing, via the processor and by the browser extension, the user device to insert a display of the relatable value into the graphical user interface of the browser operating on the user device prior to the performance of the activity by the user.

2. The computer-implemented method of claim 1, wherein the at least one financial goal includes a savings goal.

3. The computer-implemented method of claim 1, wherein the user financial data further includes further data including one or more of a purchase history of the user or one or more consumer interest characteristics of the user.

4. The computer-implemented method of claim 3, wherein the relatable product is selected from amongst the plurality of products based on the further data.

5. The computer-implemented method of claim 4, wherein the relatable product is selected from amongst the plurality of products based on a determined frequency of purchase of the relatable product by the user.

6. The computer-implemented method of claim 5, wherein the relatable value is expressed in terms of a quantity of the relatable product at the determined frequency, such that the income for the performance of the activity by the user is represented as an inability to purchase the relatable product at the determined frequency.

7. The computer-implemented method of claim 1, wherein the relatable value is expressed in terms of a quantity of the relatable product at a particular rate.

8. A system for performing real-time monitoring, comprising:

at least one memory storing instructions, user financial data, relatable product data related to a plurality of products, and cost values of the plurality of products, wherein the user financial data includes at least one financial goal of a user, and the at least one financial goal is associated with at least one trigger condition; and at least one processor operatively connected to the at least one memory and configured to execute the instructions to perform operations, including:

determining, via a browser extension operating on a user device associated with the user and based on an interaction between the user and; a graphical user interface of a browser also operating on the user device, that the user is considering whether to perform an activity that results in an income for the user, the interaction being prior to a performance of the activity by the user;

in response to receiving the determination, determining, based on the user financial data, that the income resulting from performing the activity by the user meets the at least one trigger condition associated with the financial goal of the user;

in response to determining that the at least one trigger condition has been met, determining, based on the relatable product data, a relatable value for the income, the relatable value being a representation of the value of the income as a quantity of a relatable product from amongst the plurality of products; and causing, by the browser extension, the user device to insert a display of the relatable value into the graphical user interface of the browser operating on the user device prior to the performance of the activity by the user.

9. The system of claim 8, wherein the at least one financial goal includes a savings goal.

10. The system of claim 8, wherein the user financial data further includes further data including one or more of a purchase history of the user or one or more consumer interest characteristics of the user.

11. The system of claim 10, wherein the relatable product is selected from amongst the plurality of products based on the further data.

12. The system of claim 11, wherein the relatable product is selected from amongst the plurality of products based on a determined frequency of purchase of the relatable product by the user.

13. The system of claim 12, wherein the relatable value is expressed in terms of a quantity of the relatable product at the determined frequency, such that the performance of the activity by the user is represented as an inability to purchase the relatable product at the determined frequency.

14. The system of claim 8, wherein the at least one financial goal includes a spending limit.

15. The system of claim 8, wherein the relatable value is expressed in terms of a quantity of the relatable product at a particular rate.

16. A computer-implemented method of performing real-time monitoring, comprising:

determining, via a browser extension operating on a user device associated with a user and based on an interaction between the user and a graphical user interface of a browser also operating on the user device, that the user is considering whether to perform an activity that results in an income for the user, wherein:

the interaction is performance of the activity by the user; and the determination is received by a server system that includes a processor and a memory that stores user financial data, relatable product data related to a plurality of products, and cost values of the plurality of products;

in response to receiving the determination:

determining, via the processor and based on the determination, an estimated impact of the income on the user;

determining, via the processor, and based on the relatable product data, a relatable value for the income, the relatable value being a representation of the estimated impact of the income as a quantity of a relatable product from amongst the plurality of products; and causing, via the processor and by the browser extension, the user device to insert a display of the relatable value into the graphical user interface of the browser operating on the user device prior to the performance of the activity by the user.

17. The computer-implemented method of claim 16, wherein:

the user financial data further includes further data including one or more of a purchase history of the user or one or more consumer interest characteristics of the user; and the relatable product is selected from amongst the plurality of products based on the further data.

18. The computer-implemented method of claim 17, wherein the relatable product is selected from amongst the plurality of products based on a determined frequency of purchase of the relatable product by the user.

19. The computer-implemented method of claim 18, wherein the relatable value is expressed in terms of a quantity of the relatable product at the determined frequency, such that the income is represented as an inability to purchase the relatable product at the determined frequency.

* * * * *